United States Patent
Gao et al.

(10) Patent No.: US 11,854,287 B2
(45) Date of Patent: Dec. 26, 2023

(54) VISUAL MODE IMAGE COMPARISON

(71) Applicant: INTERNATIONAL BUSINESS MACHINES CORPORATION, Armonk, NY (US)

(72) Inventors: Li Juan Gao, Xi'an (CN); Zhong Fang Yuan, Xi'an (CN); Tong Liu, Xi'an (CN); Ming Xia Shi, Ningbo (CN); Ming Jin Chen, Zhe Jiang (CN)

(73) Assignee: International Business Machines Corporation, Armonk, NY (US)

(*) Notice: Subject to any disclaimer, the term of this patent is extended or adjusted under 35 U.S.C. 154(b) by 92 days.

(21) Appl. No.: 17/456,197

(22) Filed: Nov. 23, 2021

(65) Prior Publication Data

US 2023/0162521 A1 May 25, 2023

(51) Int. Cl.
*G06V 30/418* (2022.01)
*G06V 30/148* (2022.01)
*G06V 30/413* (2022.01)
*G06V 30/19* (2022.01)

(52) U.S. Cl.
CPC .......... *G06V 30/418* (2022.01); *G06V 30/153* (2022.01); *G06V 30/19013* (2022.01); *G06V 30/413* (2022.01)

(58) Field of Classification Search
CPC .. G06V 30/418; G06V 30/413; G06V 30/153; G06V 30/19013
See application file for complete search history.

(56) References Cited

U.S. PATENT DOCUMENTS

| 7,558,429 B2 | 7/2009 | Lin |
| 9,008,424 B2 | 4/2015 | Cordara |
| 9,342,756 B2 | 5/2016 | Deng |

(Continued)

FOREIGN PATENT DOCUMENTS

| CN | 100414565 C | * | 8/2008 | ......... G06K 9/00456 |
| CN | 111382290 A |   | 7/2020 | |

(Continued)

OTHER PUBLICATIONS

Disclosed Anonymously, "A Dynamic Method to Compare the Difference Between a Physical File and a Digital File", IPCOM000264867D, Feb. 2, 2021, pp. 1-3.

(Continued)

*Primary Examiner* — Pinalben Patel
(74) *Attorney, Agent, or Firm* — Daniel J Blabolil

(57) ABSTRACT

A method, a computer program product, and a computer system compare images for content consistency. The method includes receiving a first image including a first document and a second image including a second document. The method includes performing a visual classification analysis on the first image and the second image. The visual classification analysis generates an overlap of the first image with the second image. The method includes determining whether a region of the overlap is indicative of a content inconsistency. As a result of the region of the overlap being indicative of a content inconsistency, the method includes performing a character recognition analysis on a first area of the first image and a second area of the second image corresponding to the region of the overlap to verify the content inconsistency.

20 Claims, 6 Drawing Sheets

(56) References Cited

U.S. PATENT DOCUMENTS

| | | | |
|---|---|---|---|
| 9,396,388 B2 | 7/2016 | Amtrup | |
| 9,613,290 B2 | 4/2017 | Lee | |
| 10,769,503 B1* | 9/2020 | Buhler | G06F 16/56 |
| 2009/0074291 A1* | 3/2009 | Iinuma | G06V 30/413 |
| | | | 382/178 |
| 2011/0197121 A1* | 8/2011 | Kletter | G06F 40/194 |
| | | | 715/255 |
| 2013/0110579 A1 | 5/2013 | Aydin | |
| 2014/0254887 A1 | 9/2014 | Amtrup | |
| 2015/0302272 A1* | 10/2015 | Deng | G06F 16/51 |
| | | | 382/219 |
| 2017/0262435 A1* | 9/2017 | Sonoo | G06F 40/56 |
| 2020/0410232 A1* | 12/2020 | Ono | G06V 30/418 |

FOREIGN PATENT DOCUMENTS

| | | |
|---|---|---|
| CN | 112115111 A | 12/2020 |
| CN | 113269195 A * | 8/2021 |

OTHER PUBLICATIONS

Mell et al., "The NIST Definition of Cloud Computing", National Institute of Standards and Technology, Special Publication 800-145, Sep. 2011, pp. 1-7.

* cited by examiner

VISUAL MODE IMAGE COMPARISON

BACKGROUND

The exemplary embodiments relate generally to images, and more particularly to comparing images to one another using a multi-tiered approach including a classification analysis and a character recognition analysis.

There are a number of times when two copies of a document need to be compared to discover any discrepancies. Two scanned copies of contracts, application forms, bills, etc. may be captured as images and compared to see whether the content in the two images is consistent. For example, when a scanned file is sent out to receive signatures, there is a need to ensure that the content of the received and signed documents have not changed. Numerous departments and fields utilize this content comparison process such as accounting departments, taxation departments, auditing departments, etc. Conventional approaches are often inefficient as an inordinate amount of time may be required. Even automated approaches may increase the efficiency but may not achieve the same accuracy in determining consistency which may lead to false positives and negatives.

SUMMARY

The exemplary embodiments disclose a method, a computer program product, and a computer system for comparing two images for content consistency. The method comprises receiving a first image including a first document and a second image including a second document. The method comprises performing a visual classification analysis on the first image and the second image. The visual classification analysis generates an overlap of the first image with the second image. The method comprises determining whether a region of the overlap is indicative of a content inconsistency. As a result of the region of the overlap being indicative of a content inconsistency, the method comprises performing a character recognition analysis on a first area of the first image and a second area of the second image corresponding to the region of the overlap to verify the content inconsistency.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
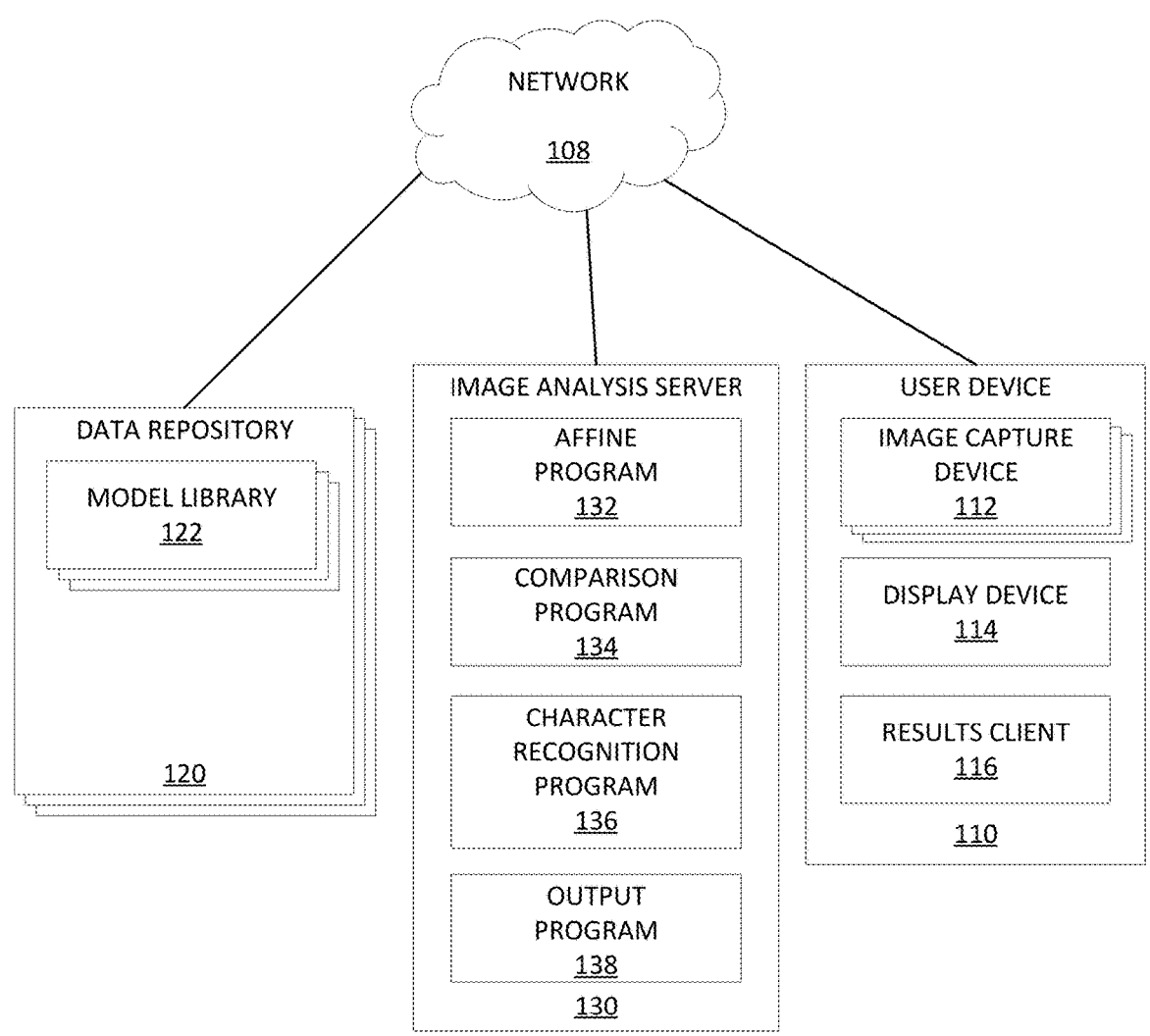
FIG. 1 depicts an exemplary schematic diagram of a image comparison system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for comparing two images for content consistency. The exemplary embodiments provide a mechanism in which images may be compared using an image affine, overlap technology, visual feature classifications, and character recognition. The mechanism according to the exemplary embodiments may identify corresponding regions between the images where a content inconsistency may exist and further analyze these regions to verify whether there is content consistency between the images. Key benefits of the exemplary embodiments may include a more accurate and efficient manner of determining content consistency between two images. Detailed implementation of the exemplary embodiments follows.

Conventional approaches have provided a variety of mechanisms for comparing images to one another for consistency. For example, a conventional approach in comparing images such as scanned documents or bills involves a user manually reading through the images. Although such an approach may allow for more thorough examination and intuition to be incorporated, this conventional approach requires a significantly high labor cost while also introducing human error (e.g., omissions during examination). In another example, a conventional approach incorporated machine learning where an optical character recognition (OCR) method may be used for the images. Through OCR, a system may compare text obtained through this image analysis to discover any differences. However, the OCR process must be performed on the entire image which increases the amount of time needed to analyze an image resulting in unnecessary resource consumption and affecting overall execution efficiency. The OCR process also does not accurately detect inconsistencies when non-character regions are compared such as reporting charts, tables, chops, etc.

The exemplary embodiments are configured to compare images to determine content consistency with an increased accuracy while conserving resources. As will be described in further detail below, the exemplary embodiments may affine images to perform an overlap analysis using a classification approach and categorizing corresponding regions of the images. As a result of the classification results, the exemplary embodiments may subsequently perform a recognition analysis using a character recognition approach to the corresponding regions of the images that have identified a use of this further analysis.

FIG. 1 depicts an image comparison system 100, in accordance with the exemplary embodiments. According to the exemplary embodiments, the image comparison system 100 may include a user device 110, one or more data repositories 120, and an image analysis server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the image comparison system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the image comparison system 100 that do not utilize the network 108.

In the exemplary embodiments, the user device 110 may include one or more image capture devices 112, a display device 114, and a results client 116, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the user device 110 is shown as a single device, in other embodiments, the user device 110 may be comprised of a cluster or plurality of computing devices, in a modular manner, etc., working together or working independently. The user device 110 is described in greater detail as a hardware implementation with reference to FIG. 5 (e.g., data processing according to the exemplary embodiments being performed by processor 02), as part of a cloud implementation with reference to FIG. 6 (e.g., the device 110 according to the exemplary embodiments being represented by the laptop computer 54C), and/or as utilizing functional abstraction layers for processing with reference to FIG. 7 (e.g., workload layer 90 including image comparison processing 96 according to the exemplary embodiments). The user device 110 may be utilized by a user who is performing a task on a unit or asset in a self guidance manner (e.g., without instruction from another user).

In the exemplary embodiments, the one or more image capture devices 112 may be configured to generate images of documents. For example, the documents may be text documents, contracts, bills, invoices, accounting papers, tax documents, auditing documents, etc. In an exemplary embodiment, the image capture devices 112 may be an imager that is used to physically capture an image of the document and generate a corresponding image of the document. In another exemplary embodiment, the image capture devices 112 may convert raw data into a corresponding image where the image includes one or more documents. The image capture devices 112 may also represent any application, process, mechanism, etc. in which an image of a document may be generated for subsequent processing. For example, the image capture devices 112 may be a print option in which a file is converted into an image file. In another example, the image capture devices 112 may be a communication link in which an image is received (e.g., via a network connection, a flash drive, etc.). In this manner, the image capture device 112 may relate to any device, apparatus, process, means, etc. in which an image of a document is obtained.

In the exemplary embodiments, the display device 114 may be any device configured to show visual information to a user of the user device 110. As the exemplary embodiments are directed to images and processing of such images, the user may review the images from the image capture devices 112 prior to submitting the images for further processing. For example, when the user utilizes an imager to capture an image of a document, the parameters of the imager may be improperly set that result in poor image quality (e.g., out of focus, sections cropped out, etc.). The user may review the images as displayed on the display device 114 to ensure that the images are of a minimum quality. However, the manual review of the images is only for illustrative purposes. The exemplary embodiments may utilize an automated approach to automatically analyze the images to determine a confidence level of a quality of the images. Thus, the exemplary embodiments may assess the images and determine whether the confidence level reaches a predetermined minimum threshold. As a result of the confidence level being at least the predetermined minimum threshold, the exemplary embodiments may continue with the further processing. However, as a result of the confidence level being below the predetermined minimum threshold, the user may be requested to resubmit any image that does not satisfy this factor.

The display device 114 may also be used for the user to view results. As will be described in further detail below, the user may be presented with results of the comparison of the images for content consistency.

In the exemplary embodiments, the results client 116 may act as a client in a client-server relationship and may be a software, hardware, and/or firmware based application capable of receiving and formatting results data from comparing images that were submitted to determine content consistency via the network 108. In embodiments, the results client 116 may provide a user interface in which the user may establish a session where images may be submitted and the results may be received to be shown to the user as well as interact with one or more components of the image comparison system 100, and utilize various wired and/or wireless connection protocols for data transmission and exchange associated with data used for image comparison analysis, including Bluetooth, 2.4 gHz and 5 gHz internet, near-field communication, Z-Wave, Zigbee, etc.

In the exemplary embodiments, the data repository 120 may include one or more object model libraries 122 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the data repository 120 is shown as a single device, in other embodiments, the data repository 120 may be comprised of a cluster or plurality of electronic devices, in a modular manner, etc., working together or working independently. While the data repository 120 is also shown as a separate component, in other embodiments, the data repository 120 may be incorporated with one or more of the other components of the image comparison system 100. For example, the data repository 120 may be incorporated in the image analysis server 130. Thus, access to the data repository 120 by the image analysis server 130 may be performed locally. The data repository 120 is described in greater detail as a hardware implementation with reference to FIG. 5, as part of a cloud implementation with reference to FIG. 6, and/or as utilizing functional abstraction layers for processing with reference to FIG. 7.

In the exemplary embodiments, the model library 122 may include various models used by the exemplary embodiments to compare images. As will be described in further detail below, the model library 122 may include classification models (e.g., visual feature classification model) used to recognize overlapped images and categorize regions or sections of the images. In an exemplary embodiment, the classification model may be trained through marking sample images and using a semantic segmentation algorithm along with a residual network to extract pixel levels. The model library 122 may also include character recognition models (e.g., OCR model) used to identify characters (e.g., letters, numbers, special characters, etc.). The model library 122 may further include boundary recognition models to identify boundaries of an image as well as regions within the image.

In the exemplary embodiments, the image analysis server 130 may include an affine program 132, a comparison program 134, a character recognition program 136, and an output program 138, and act as a server in a client-server relationship with the results client 116 as well as be in a communicative relationship with the data repository 120. The image analysis server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the image analysis server 130 is shown as a single device, in other embodiments, the image analysis server 130 may be comprised of a cluster or plurality of computing devices, working together or working independently. While the image analysis server 130 is also shown as a separate component, in other embodiments, the operations and features of the image analysis server 130 may be incorporated with one or more of the other components of the image comparison system 100. For example, the operations and features of the image analysis server 130 may be incorporated in the user device 110. The image analysis server 130 is described in greater detail as a hardware implementation with reference to FIG. 5 (e.g., data processing according to the exemplary embodiments being performed by processor 02), as part of a cloud implementation with reference to FIG. 6 (e.g., the device 110 according to the exemplary embodiments being represented by the desktop computer 54B), and/or as utilizing functional abstraction layers for processing with reference to FIG. 7 (e.g., workload layer 90 including image comparison processing 96 according to the exemplary embodiments).

In the exemplary embodiments, the affine program 132 may be a software, hardware, and/or firmware application configured to receive images from the user device 110 and perform initial operations thereon. The affine program 132 may detect boundaries of the images utilizing, for example, the image boundary recognition models. The affine program 132 may also utilize other mechanisms by which a boundary may be determined as one skilled in the art will understand. The affine program 132 may also affine a pair of images in preparation for content comparison. As the images that are received may be formatted in various ways and utilize any number of parameters and values thereof, the affine program 132 may affine the pair of images to a common angle and approximate size. For example, an image of a document may have boundaries that include edges determined to be angled relative to a bounding box. The affine program 132 may rotate the image such that the edges are parallel to corresponding edges of the bounding box. In another example, the affine program 132 may enlarge one of the pair of the images to match the other of the pair of the images; may shrink one of the pair of the images to match the other of the pair of the image; or enlarge one while shrink the other for the pair of the images. The affine program 132 dynamically select the option to match the approximate size between the pair of the images such that a minimum quality of the images may be maintained for subsequent operations (e.g., based on a quality analysis in which a quality value is measured against a quality threshold determined based on whether the subsequent operations may be properly performed). Accordingly, the affine program 132 may substantially align the documents shown in the images to one another.

In the exemplary embodiments, the comparison program 134 may be a software, hardware, and/or firmware application configured to perform an overlap analysis of the pair of the images. Accordingly, with the images properly arranged to a common angle and approximate size, the comparison program 134 may overlap the images against one another. The overlap analysis may entail the comparison program 134 utilizing a visual feature classification model (e.g., from the classification models) to divide and classify the overlapping images to obtain categories corresponding to the different regions or portions of the images while overlapped. As will be described in further detail below, the comparison program 134 may categorize the different regions into a plurality of types of areas. For example, the comparison program 134 may determine whether corresponding regions in the images (1) are the same or identical, (2) have the same content but in different formats, (3) have more or less information such as words or characters from one another, and (4) are entirely inconsistent.

In the exemplary embodiments, the character recognition program 136 may be a software, hardware, and/or firmware application configured to perform a character recognition analysis for regions identified by the comparison program 134. In performing the character recognition analysis, the character recognition program 136 may utilize the character recognition models. For example, the character recognition program 136 may perform an OCR analysis to recognize the content in the corresponding regions of the pair of the images. In this manner, the character recognition program 136 may be utilized in select portions rather than over the entire image. The character recognition program 136 may also be used to improve accuracy by verifying the results of the comparison program 134.

In the exemplary embodiments, the output program 138 may be a software, hardware, and/or firmware application configured to generate the results of the comparison performed for the images with regard to content consistency. For example, the output program 138 may transmit the results to the user device 110 such that the user may view the results through a user interface shown on the display device 114. The output program 138 may determine the regions that have been verified as having inconsistent content through the above described process. In this manner, the user may focus any attention on the indicated regions and determine a course of action based on the results from the exemplary embodiments.

Figure 2:
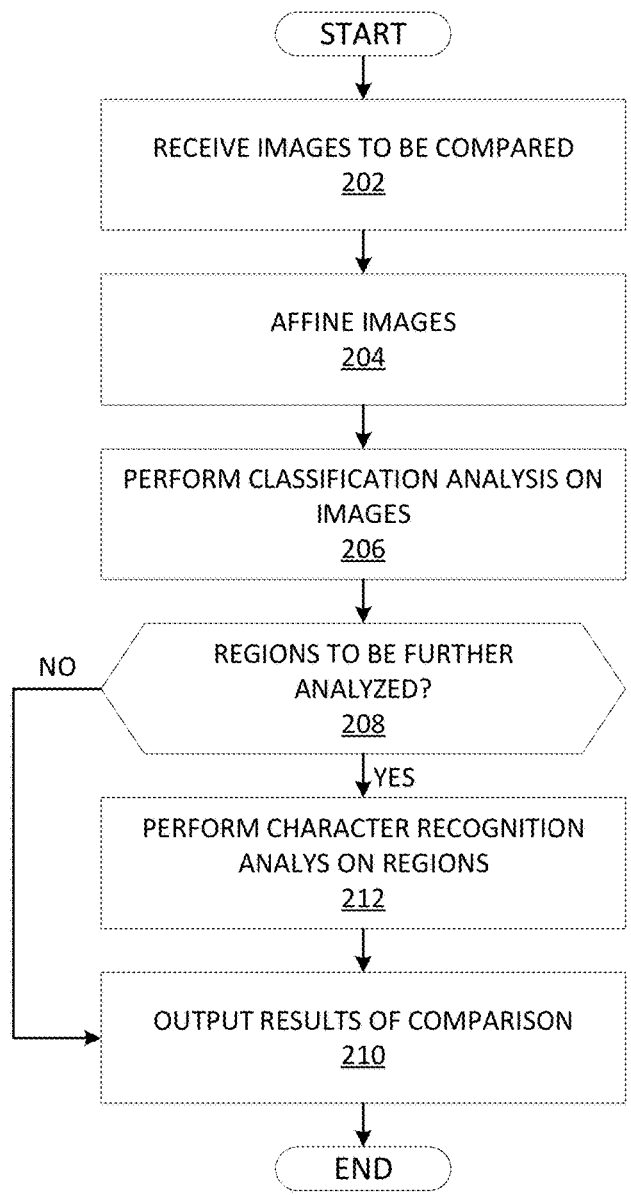
FIG. 2 depicts an exemplary flowchart of a method illustrating the operations of an image analysis server 130 of the image comparison system 100 in comparing images for content consistency, in accordance with the exemplary embodiments.

FIG. 2 depicts an exemplary flowchart of a method 200 illustrating the operations of the image analysis server 130 of the image comparison system 100 in comparing images for content consistency, in accordance with the exemplary embodiments. The method 200 may relate to operations that are performed by the affine program 132, the comparison program 134, the character recognition program 136, and the output program 138. The method 200 will be described from the perspective of the image analysis server 130.

The image analysis server 130 may receive images to be compared (step 202). A user may utilize the features of the exemplary embodiments by providing images that are to be compared to determine content consistency. Each image may include a document where the content of the documents is to be compared. The images may be generated by capturing an image of the document, scanning the document to produce a corresponding image, printing an electronic copy of the document into an image, etc. For illustrative purposes, the image analysis server 130 may compare two images where each image includes a document for content comparison. However, the use of two images is only exemplary. There may be a greater number of images where each image includes a document for content comparison.

The image analysis server 130 may affine the images (step 204). Specifically, the image analysis server 130 may affine the document contained in the images. The image analysis server 130 may detect a boundary of the document in the image utilizing, for example, the boundary recognition model. The two images may also be affinely transformed for the document therein to have the same angle and approximate size. The image analysis server 130 may utilize training data of the boundary recognition model through an input of images with their marked boundary lines (e.g., boundaries of a document therein). The image analysis server 130 may utilize a convolutional neural network architecture (CNN) (e.g., Unet) to perform a semantic segmentation of the image through a series of downsampling and upsampling (e.g., four downsampling and four upsampling for a document on a quadrilateral plane such as a rectangle) to detect the boundary of the document in the image. After the image boundary detection is completed, the image analysis server 130 may affine the two images to the same angle and size approximately according to the vertices of the boundary (e.g., four vertices for a rectangular document plane). The exemplary embodiments being directed toward documents with edges and vertices is described for illustrative purposes. The image analysis server 130 may also be configured to modify and/or manipulate the image in manner that retains the content of the documents. For example, a document may have been rolled up and flattened but still exhibit a curvature. Thus, after the user unrolls the document to capture an image, the image may include curved boundaries of the document. The image analysis server 130 may perform image modification processes to create matching boundaries that coincide with the document captured in the other image. In another example, the exemplary embodiments are directed to conventional and more often used document formats (e.g., rectangular plane). However, the image analysis server 130 may also be configured to analyze images that have unconventional shapes (e.g., circular plane) and utilize various boundary techniques (e.g., further boundary detection models) to affine the documents in the images.

The image analysis server 130 may perform a classification analysis on the images (step 206). Specifically, for the two images, the image analysis server 130 may perform an image overlap processing after the affine. In this manner, the image analysis server 130 may generate a further image that is an overlap of the first image with the second image. The image analysis server 130 may use, for example, the visual feature classification model to recognize the overlapped images and then divide or categorize the images into one of a plurality of types for the regions. As described above, the categories may include (1) identical, (2) same content but in different formats (e.g., including spaces, line breaks, etc.), (3) more or less words or characters, and (4) inconsistent (e.g., completely or partially).

The image analysis server 130 may train the visual feature classification model by inputting a pair of images where inconsistent areas or regions and corresponding categories in the images are marked. During the model training, the image analysis server 130 may input the overlapped image group and the corresponding labeled data into the model such that the inconsistent areas after the overlap of the images are detected by an image semantic segmentation algorithm. The image analysis server 130 may then use a residual network to extract a pixel level of the overlapped image features and determine a final classification result through a softmax layer. Accordingly, when using the model, the image analysis server 130 may input two affine images overlap and detect inconsistencies which are classified by the visual feature classification model to obtain the inconsistent areas or regions and corresponding categories.

Figure 3:
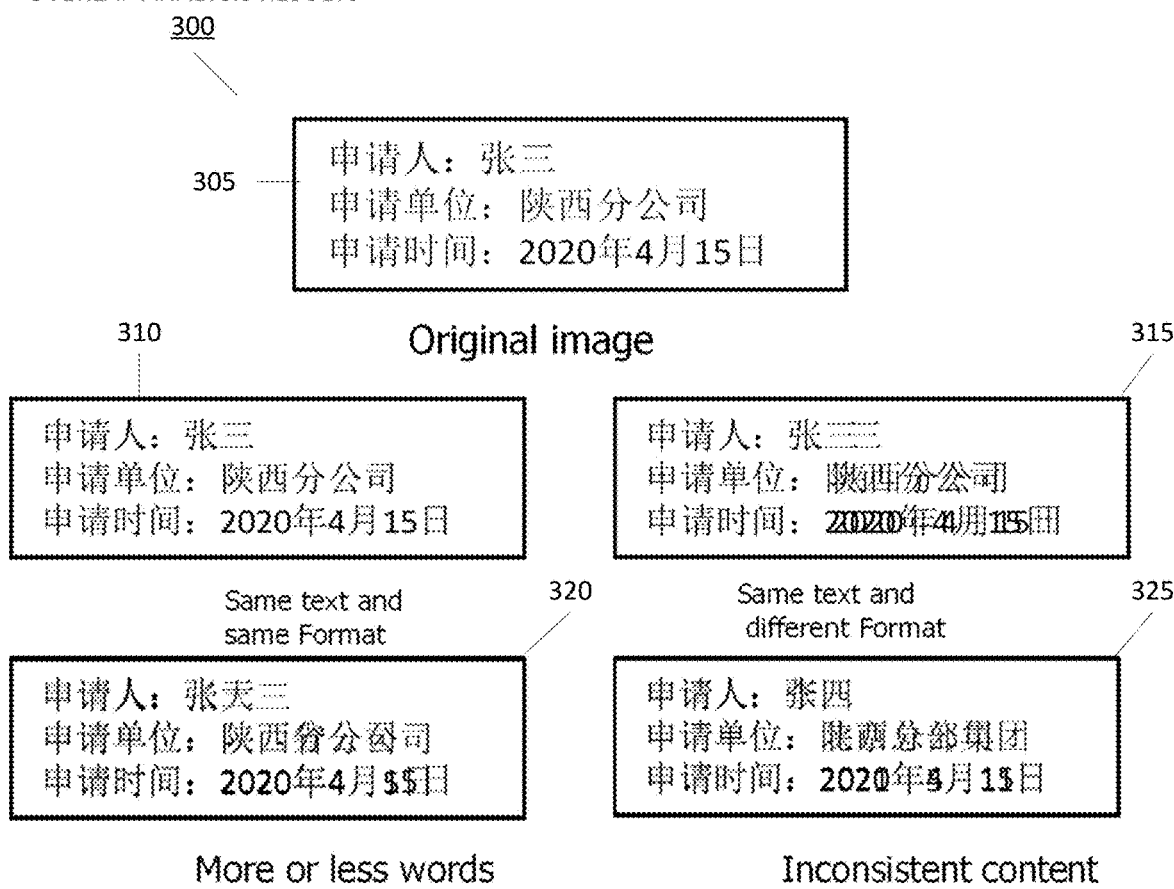
FIG. 3 depicts exemplary results of an overlap analysis performed by the image analysis server 130 of the image comparison system 100, in accordance with the exemplary embodiments.

FIG. 3 depicts exemplary results 300 of an overlap analysis performed by the image analysis server 130 of the image comparison system 100, in accordance with the exemplary embodiments. As described above, the image analysis server 130 may determine a category for a result of a comparison for corresponding regions between the two images. For example, the categories may include (1) identical, (2) same content in different formats, (3) more or less characters, and (4) inconsistent. The results 300 illustrate these various categories. The results 300 show an original image 305 for one of the documents contained in one of the images being compared. The original image 305 may provide at least one basis in which to determine the category. The original image 305 may also relate to a region of the document. The results 300 also show a plurality of overlaps 310-325 where each of the overlaps 310-325 corresponds to one of the above enumerated categories. The overlaps 310-325 may relate to the same region of the document as the original image 305.

The overlap 310 may illustrate corresponding regions in the document where the visual feature classification analysis shows an identical result. For example, the overlap 310 has identical visual features that are present in the same location within a margin of error (e.g., the margin of error may be determined through the above noted training such as where the margin of error is more indicative of being the same than being different). Thus, the image analysis server 130 may determine that the overlap 310 having the identical result has content consistency.

The overlap 315 may illustrate corresponding regions in the document where the visual feature classification analysis shows that the same content is present in both documents but a different format is being used. For example, in some portions of the regions, the overlap 310 has identical visual features that are present in the same location within the margin of error. However, in other portions of the regions, the overlap 310 has substantially similar visual features that are present in relatively similar locations (e.g., above the margin of error) but not identically located. The image analysis server 130 may determine that the overlap 315 creates essentially a shift effect where the portions of the regions appear to be shifted, for example, laterally. Accordingly, the region may include identical content which is indicative of content consistency but the format may be slightly different (e.g., different spacing when filling each line). Thus, the image analysis server 130 may determine that the overlap 315 having the same content but different format result has content consistency.

The overlap 320 may illustrate corresponding regions in the document where the visual feature classification analysis shows that there is a difference in the words or characters that are present in the images. For example, in some portions of the regions, the overlap 320 has identical visual features that are present in the same location within the margin of error (e.g., although slightly more shifted than the overlap 310 and the overlap 315). However, in other portions of the regions, the overlap 320 has noticeably different visual features that are present in relatively similar locations. The image analysis server 130 may have a high confidence that the images are properly affined as other portions of the region are substantially identical. The image analysis server 130 may utilize the original image 305 to determine that the overlap 320 has more or less characters. For example, in one line of the region (e.g., top line), the original image 305 includes six total characters (e.g., five language characters and one colon). However, in the same line of the region (e.g., top line), the overlap 320 includes seven total characters. In this manner, the image analysis server 130 may determine that a first document in a first image has a different number of characters than a second document in a second image. The image analysis server 130 may come to a substantially similar result for the other lines of the region (e.g., middle line and bottom line). Thus, the image analysis server 130 may determine that the overlap 320 may potentially include different content.

The overlap 325 may illustrate corresponding regions in the document where the visual feature classification analysis shows that there is inconsistent content. For example, in some portions of the regions, the overlap 320 has identical visual features that are present in the same location within the margin of error (e.g., mirroring the examples of the overlap 310 and the overlap 315). However, in other portions of the regions, the overlap 325 has significantly different visual features that are present in relatively similar locations (e.g., a difference that exceeds a predetermined threshold). In a manner substantially similar to the overlap 320, the image analysis server 130 may have a high confidence that the images are properly affined as other portions of the region are substantially identical. The image analysis server 130 may determine that the result of the overlap 325 for a given image portion (e.g., the image of a character) differs beyond an acceptable threshold from the same image portion of the original image 305. In this manner, the image analysis server 130 may determine that a first document in a first image potentially has different content or inconsistent content to a second document in a second image. Thus, the image analysis server 130 may determine that the overlap 325 may potentially include different content.

The image analysis server 130 may determine whether there are regions to be further analyzed (decision 208). Specifically, the image analysis server 130 may utilize the results of the visual classification analysis. As described above, there may be a plurality of categories that may be used to identify the corresponding regions of the images. Among the categories, there may be a set of categories in which there is content consistency and a remaining set of categories in which there is content inconsistency. For example, the prior two categories described above (e.g., (1) identical and (2) same content but different format) may be the set of categories with content consistency while the latter two categories described above (e.g., (3) more or less words or characters and (4) inconsistent content) may be the set of categories with content inconsistency. In this manner, the image analysis server 130 may identify whether any of the corresponding regions of the images have been determined to have any category that is indicative of content inconsistency.

As a result of the image analysis server 130 determining that there are no corresponding regions of the documents that have content inconsistency (decision 208, "NO" branch), the image analysis server 130 may continue to output the results of the comparison (step 210). Specifically, in this scenario, the image analysis server 130 may transmit the results to the results client 116 of the user device 110 which generates a user interface indicating the corresponding results that the documents contained in the images are consistent in their content.

As a result of the image analysis server 130 determining that at least one of the corresponding regions of the documents have content inconsistency (decision 208, "YES" branch), the image analysis server 130 may perform a subsequent analysis to verify the results of the visual feature classification analysis. Specifically, the image analysis server 130 may perform a character recognition analysis on the indicated regions having a category indicative of content inconsistency (step 212). In an exemplary embodiment, the image analysis server 130 may utilize an OCR model to recognize the characters in the identified regions. In a particular implementation, the image analysis server 130 may utilize the OCR model and corresponding OCR process to recognize the characters only in the identified regions. As the visual feature classification process described above has already identified regions that are content consistent, the image analysis server 130 may utilize the OCR process to verify that the regions identified as being content inconsistent are indeed content inconsistent. For example, the visual feature classification process may utilize less resources and require less time than the OCR process. Therefore, limiting the OCR process to those regions that have been identified as being or potentially being content inconsistent results in an overall decrease in resource and time usage (e.g., in contrast to utilizing the OCR process across the entire images). In performing the OCR process, the image analysis server 130 may determine the region of the overlap that includes the content inconsistency and subsequently identify a first area of the first image and a second area of the second image that corresponds to the region of the overlap. In this manner, the OCR process is performed on the first area of the first image and the second area of the second image to determine the individual characters in each image. Accordingly, the OCR process may provide a plurality of features such as verifying the results of the visual classification analysis and recognizing the content in the corresponding regions and returning the results of the character recognition analysis to the user (step 210).

Figure 4:
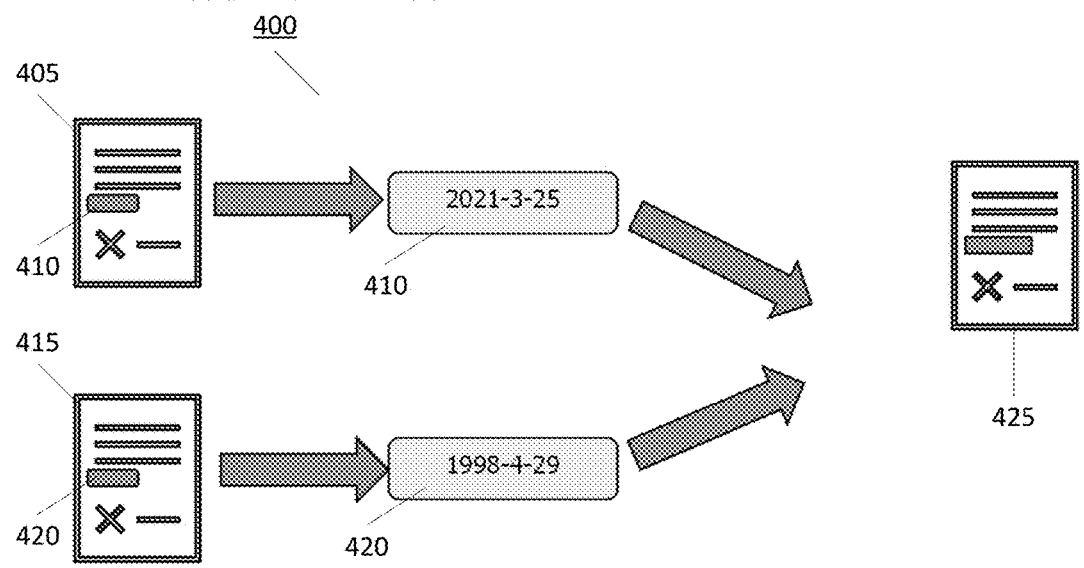
FIG. 4 depicts an exemplary sample of a character recognition analysis performed by the image analysis server 130 of the image comparison system 100, in accordance with the exemplary embodiments.

FIG. 4 depicts an exemplary sample 400 of a character recognition analysis performed by the image analysis server 130 of the image comparison system 100, in accordance with the exemplary embodiments. As described above, the documents included in the images that are being compared may include a region that is determined to be content inconsistent as a result of the image analysis server 130 performing the visual characteristic analysis. For example, a first image 405 may include a first document and a second image 415 may include a second document and the first and second documents are to be compared for content consistency. The first image 405 may include a first region 410 and the second image 415 may include a second region 420. The first region 410 and the second region 420 may be corresponding regions in the first image 405 and the second image 415, respectively.

The image analysis server 130 may perform the visual characteristic analysis and determine that all regions of the first image 405 and the second image 415 are identical except for the first region 410 and the second region 420. The image analysis server 130 may have determined that, based on the overlap analysis, the first region and the second region 420 are inconsistent (e.g., the overlap 325). Accordingly, the image analysis server 130 may continue with the character recognition analysis by using the OCR process. FIG. 4 also shows an enlarged view of the first region 410 and the second region 420. As is evident, the characters included in the first region 410 are completely inconsistent with the characters included in the second region 420 (e.g., a date may be included but two different dates are determined). Accordingly, through the initial visual characteristic analysis to determine that the first region 410 and the second region 420 are content inconsistent, the image analysis server 130 may perform the character recognition analysis to verify that the first region 410 and the second region 420 are indeed content inconsistent.

As a result of verifying that the first region 410 and the second region 420 are content inconsistent, the image analysis server 130 may generate results that are transmitted to the user device 110. The results client 116 may receive the results and generate the user interface that shows the user the results. For example, the image analysis server 130 may provide information such that an output 425 is provided to the user via the results client 116. The user may then take appropriate action to address this content inconsistency between the two documents.

The above mechanism describes a process where the visual classification analysis generated a result where at least one of the corresponding regions is content inconsistent. The process then performs the character recognition analysis to positively verify the result of the visual classification analysis. However, the character recognition analysis may determine a false positive result. For example, the font used throughout the first document and the second document may be identical. However, for any reason, the font used in the first region 410 may differ from the font used in the second region 420. The fonts that are used may also be significantly different from each other that the visual classification analysis may have determined that the first region 410 and the second region 420 are content inconsistent. However, the image analysis server 130 may use the character recognition analysis to negate the finding of the visual characteristic analysis when the characters are indeed a match and are indicative of content consistency. In another example, the first region 410 may be a date following a first regional standard (e.g., year/month/day) while the second region 420 may be a date following a second regional standard (e.g., month/day/year). The visual classification analysis may determine that the first region 410 and the second region 420 are content inconsistent in light of the overlap analysis. However, the character recognition analysis may incorporate such standards and determine that the dates are in fact identical, just written with different standards. Accordingly, the image analysis server 130 may confirm that the first region 410 and the second region 420 are content consistent through the follow-up process of character recognition.

As described above, the exemplary embodiments may be performed in comparing two images, each including a document. Thus, a first image may include a first document or a first version of the document and a second image may include a second document or a second version of the document. The exemplary embodiments may be utilized to determine whether the first document or the first version of the document has content that is consistent with the second document or the second version of the document. As noted above, the exemplary embodiments may be performed for further images where each image also includes a document or a version of the document. In this manner, a set of images with corresponding documents may be compared with one another to determine whether there is content consistency throughout the entire set of documents. As the pairs of images increase from including further images and documents, the exemplary embodiments may modify the approach and/or provide the output in a different manner. Thus, the image analysis server 130 may expand the output shown to the user to identify each instance that a content inconsistency is present, whether the inconsistency is between a pair of images or a plurality of images.

The exemplary embodiments are configured to compare images with one another to determine whether documents in the images have content consistency. The exemplary embodiments provide a mechanism to perform the comparison using a visual classification analysis that incorporates an overlap analysis in which two images are overlapped to determine regions in the documents that may have content inconsistency. In the visual classification analysis, the exemplary embodiments may categorize the results such that regions having a category that indicates content inconsistency is further processed such as with a character recognition analysis.

Figure 5:
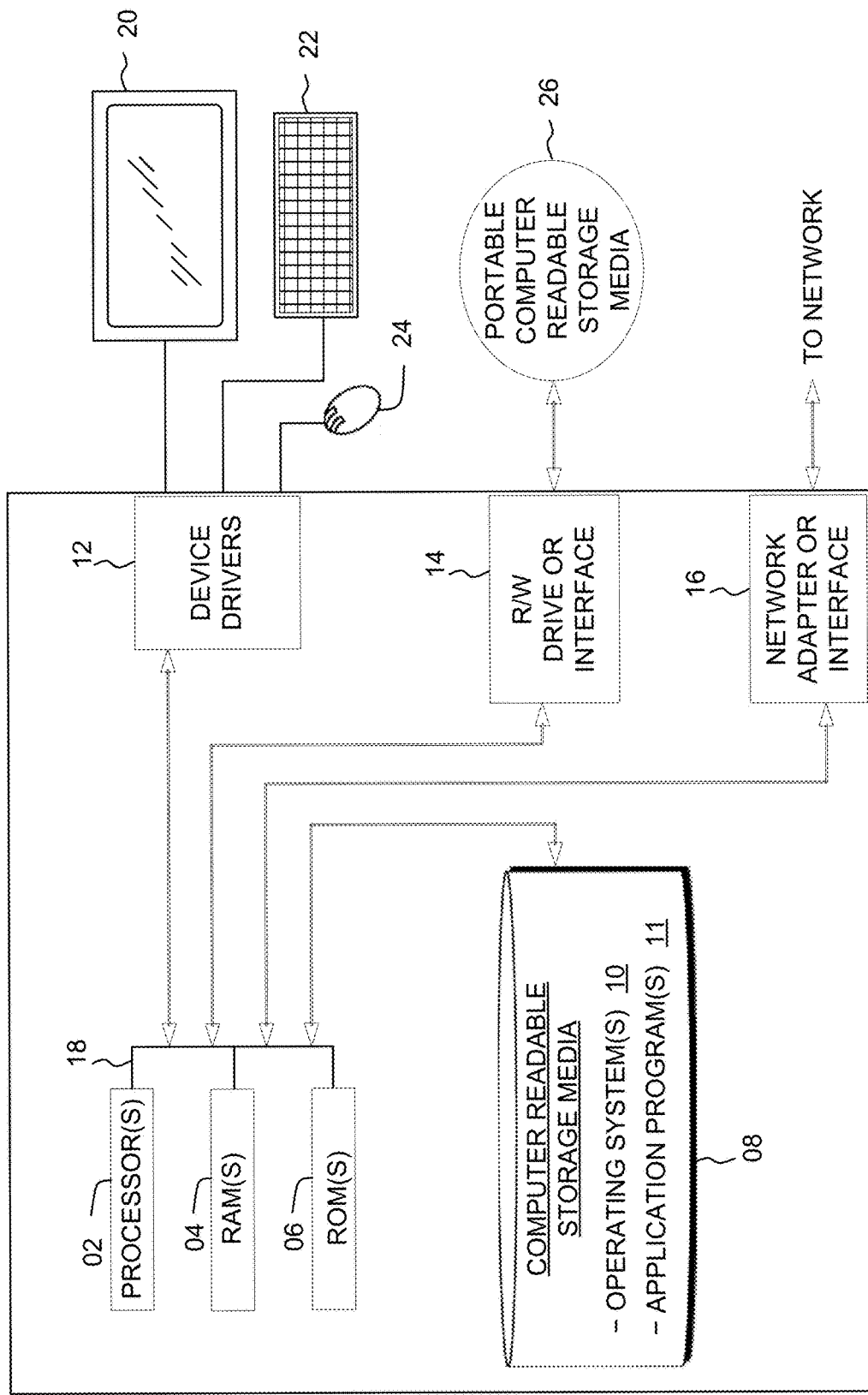
FIG. 5 depicts an exemplary block diagram depicting the hardware components of the image comparison system 100 of FIG. 1, in accordance with the exemplary embodiments.

FIG. 5 depicts a block diagram of devices within the image comparison system 100 of FIG. 1, in accordance with the exemplary embodiments. It should be appreciated that FIG. 5 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, RAY drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
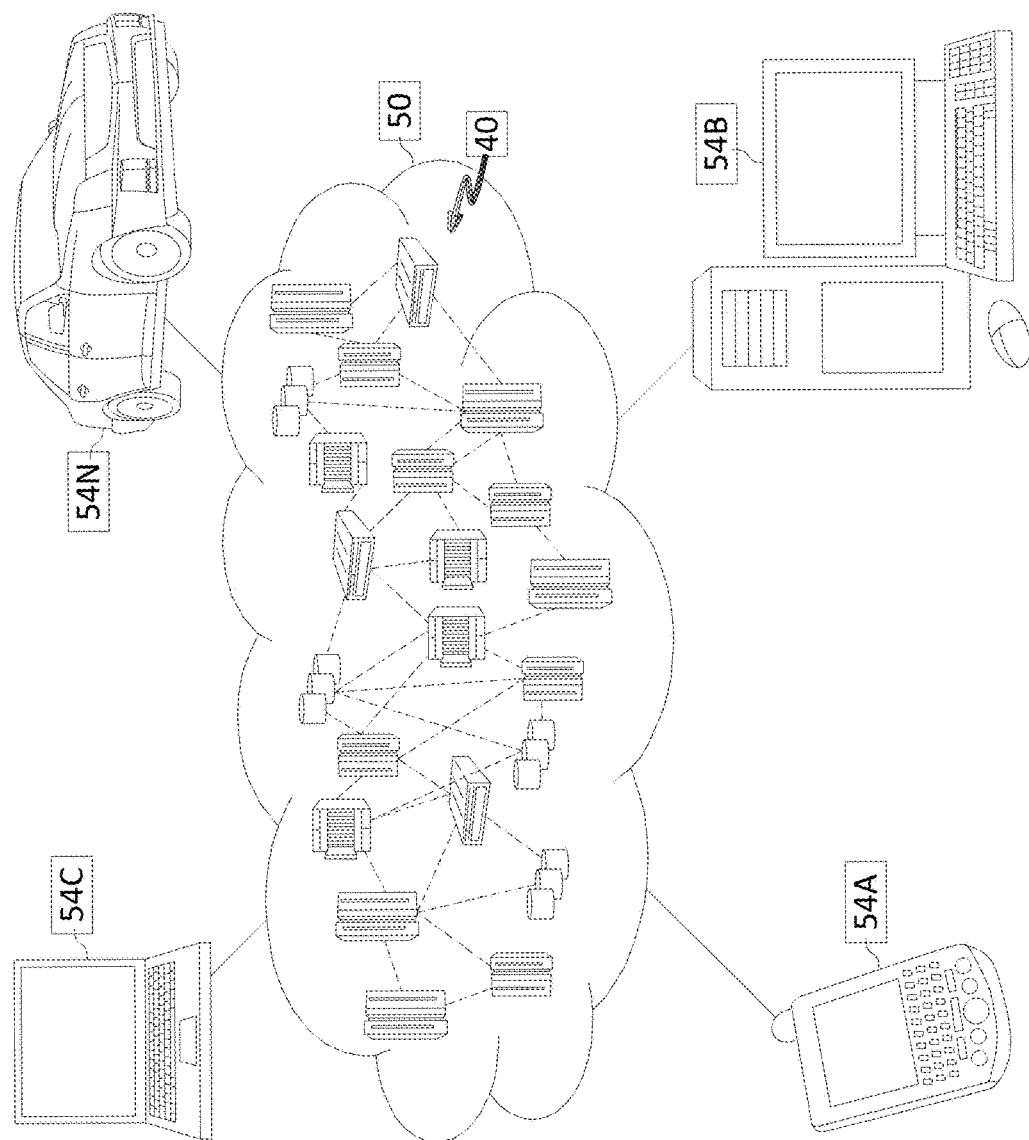
FIG. 6 depicts a cloud computing environment, in accordance with the exemplary embodiments.

Referring now to FIG. 6, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 40 and cloud computing environment 50 can communicate with any type of computerized device over any type of network and/or network addressable connection (e.g., using a web browser).

Figure 7:
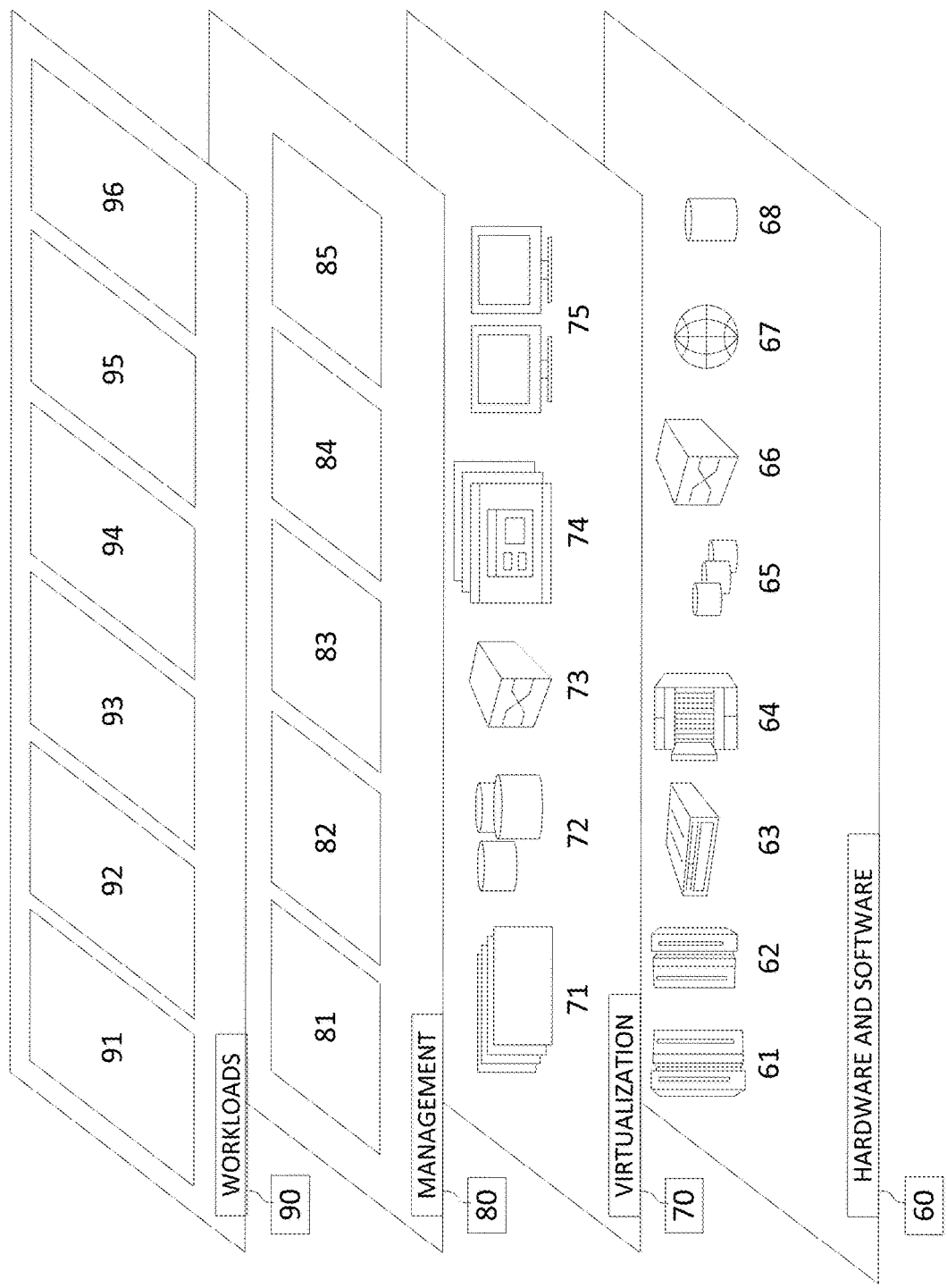
FIG. 7 depicts abstraction model layers, in accordance with the exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image comparison processing 96.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for comparing images for content consistency, the method comprising:
    receiving a first image including a first document and a second image including a second document;
    performing a visual classification analysis on the first image and the second image, the visual classification analysis generating an overlap of the first image with the second image;

determining whether a region of the overlap is indicative of a content inconsistency; and as a result of the region of the overlap being indicative of the content inconsistency, performing a character recognition analysis on a first area of the first image and a second area of the second image corresponding to the region of the overlap to verify the content inconsistency.

2. The computer-implemented method of claim 1, further comprising:

affinely transforming the first image and the second image such that the first document and the second document as included in the first image and the second image, respectively, are aligned.

3. The computer-implemented method of claim 2, wherein the first image and the second image are affinely transformed based on a common angle and an approximate size.

4. The computer-implemented method of claim 1, wherein the visual classification analysis incorporated a visual classification model trained by marked images having inconsistent areas detected with an image semantic segmentation algorithm.

5. The computer-implemented method of claim 1, wherein the determining whether the region of the overlap is indicative of the content inconsistency further comprises:

determining a category to classify the region, wherein the category is indicative of the content inconsistency.

6. The computer-implemented method of claim 5, wherein the category is one of (1) identical, (2) having same content but in a different format, (3) including more or less words or characters, and (4) inconsistencies present, wherein (3) the including of the more or less words or characters and (4) the inconsistencies present are indicative of the content inconsistency.

7. The computer-implemented method of claim 1, wherein the character recognition is an optical character recognition (OCR) process.

8. A non-transitory computer-readable storage media that configures a computer to perform program instructions stored on the non-transitory computer-readable storage media for comparing images for content consistency, the program instructions comprising:

receiving a first image including a first document and a second image including a second document;

performing a visual classification analysis on the first image and the second image, the visual classification analysis generating an overlap of the first image with the second image;

determining whether a region of the overlap is indicative of a content consistency; and as a result of the region of the overlap being indicative of the content inconsistency, performing a character recognition analysis on a first area of the first image and a second area of the second image corresponding to the region of the overlap to verify the content inconsistency.

9. The non-transitory computer-readable storage media of claim 8, wherein the program instructions further comprise:

affinely transforming the first image and the second image such that the first document and the second document as included in the first image and the second image, respectively, are aligned.

10. The non-transitory computer-readable storage media of claim 9, wherein the first image and the second image are affinely transformed based on a common angle and an approximate size.

11. The non-transitory computer-readable storage media of claim 8, wherein the visual classification analysis incorporated a visual classification model trained by marked images having inconsistent areas detected with an image semantic segmentation algorithm.

12. The non-transitory computer-readable storage media of claim 8, wherein the determining whether the region of the overlap is indicative of the content inconsistency further comprises:

determining a category to classify the region, wherein the category is indicative of the content inconsistency.

13. The non-transitory computer-readable storage media of claim 12, wherein the category is one of (1) identical, (2) having same content but in a different format, (3) including more or less words or characters, and (4) inconsistencies present, wherein (3) the including of the more or less words or characters and (4) the inconsistencies present are indicative of the content inconsistency.

14. The non-transitory computer-readable storage media of claim 8, wherein the character recognition is an optical character recognition (OCR) process.

15. A computer system for comparing images for content consistency, the computer system comprising:

one or more computer processors, one or more computer-readable storage media, and program instructions stored on the one or more of the computer-readable storage media for execution by at least one of the one or more processors capable of performing a method, the method comprising:

receiving a first image including a first document and a second image including a second document;

performing a visual classification analysis on the first image and the second image, the visual classification analysis generating an overlap of the first image with the second image;

determining whether a region of the overlap is indicative of a content inconsistency; and as a result of the region of the overlap being indicative of the content inconsistency, performing a character recognition analysis on a first area of the first image and a second area of the second image corresponding to the region of the overlap to verify the content inconsistency.

16. The computer system of claim 15, wherein the method further comprises:

affinely transforming the first image and the second image such that the first document and the second document as included in the first image and the second image, respectively, are aligned.

17. The computer system of claim 16, wherein the first image and the second image are affinely transformed based on a common angle and an approximate size.

18. The computer system of claim 15, wherein the visual classification analysis incorporated a visual classification model trained by marked images having inconsistent areas detected with an image semantic segmentation algorithm.

19. The computer system of claim 15, wherein the determining whether the region of the overlap is indicative of the content inconsistency further comprises:

determining a category to classify the region, wherein the category is indicative of the content inconsistency.

20. The computer system of claim 19, wherein the category is one of (1) identical, (2) having same content but in a different format, (3) including more or less words or characters, and (4) inconsistencies present, wherein (3) the including of the more or less words or characters and (4) the inconsistencies are indicative of the content inconsistency.

* * * * *